L. O. COLVIN.
Cow-Milker.
No. 101,589.  Patented Apr. 5, 1870.
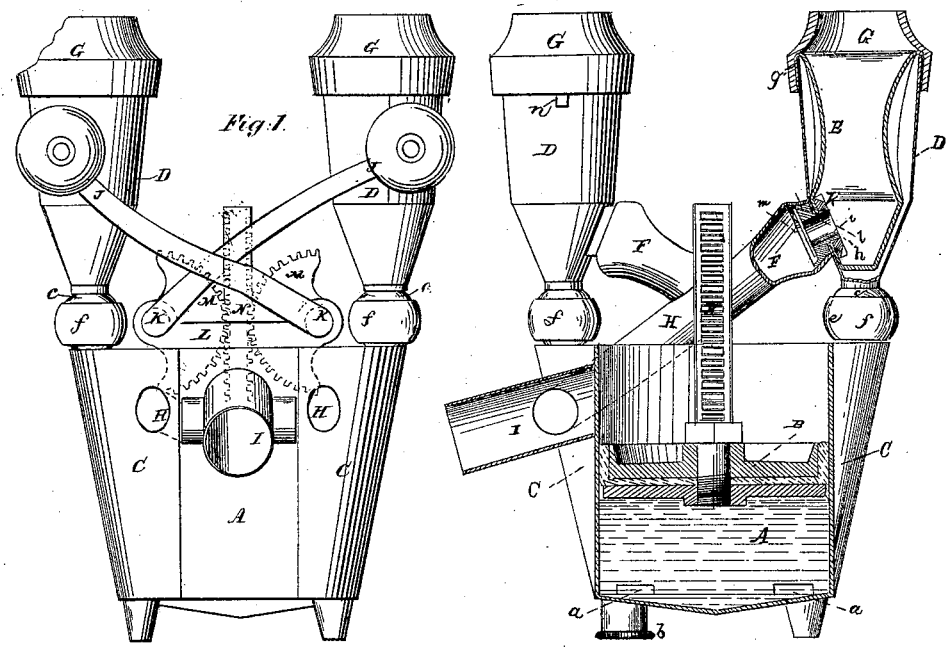
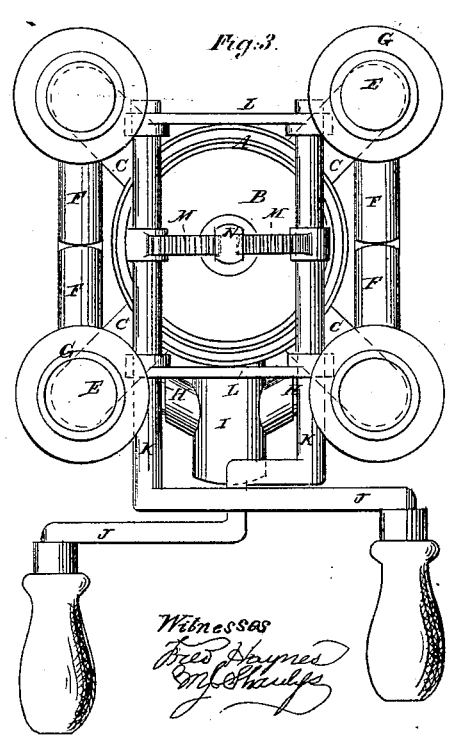
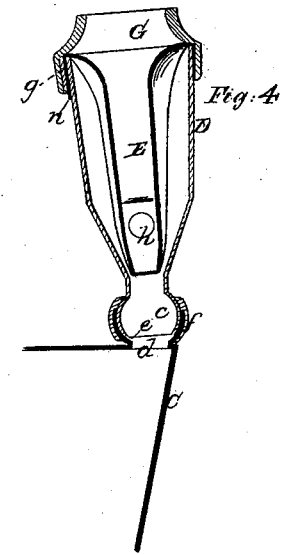

United States Patent Office.

LEIGHTON O. COLVIN, OF NEW YORK N. Y.

Letters Patent No. 101,589, dated April 5, 1870; antedated March 24, 1870.

IMPROVEMENT IN COW-MILKERS.

The Schedule referred to in these Letters Patent and making part of the same.

*To all whom it may concern:*

Be it known that I, LEIGHTON O. COLVIN, of the city, county, and State of New York, have invented a new and useful Improvement in Cow-Milkers, of which the following is a full, clear, and exact description, reference being had to the accompanying drawing forming part of this specification, and in which—

Figure 1 represents a side elevation of a milking apparatus, constructed in accordance with my invention;

Figure 2, a sectional elevation of the same, taken at right angles to fig. 1;

Figure 3, a plan thereof; and

Figure 4, a sectional view of one of the teat-cups, with its suction-sack, as connected to a lower chamber, with which said cup communicates.

Similar letters of reference indicate corresponding parts.

Although certain features of my present improvement are applicable to hydraulic cow-milkers of a different construction, such, for instance, as described or referred to in various Letters Patent previously issued to me, the invention which is the subject of the present specification is mainly designed to be used in the form of a portable or hand-apparatus, to be applied to but one cow at a time, and which may be held in the hands, as contradistinguished from a machine or combination of machines under the control of a pump which is separate from the milker or milkers proper.

To this end, and to secure certain special advantages as regards the construction and operation of particular parts, the invention consists in a milking apparatus made up of a pump, or well and plunger, and teat-cups or vessels provided with elastic sacks for producing suction on the teats by or through a fluid medium under control of the pump, when the whole are so combined and arranged as to form an entirety, or milking apparatus capable of operation by the handles which support or steady it, in such manner as that swing of or twist on the teats is avoided in the working of said handles, and so that a straight up-and-down motion is or may be communicated to the whole in accordance with the natural sucking-action or motion of the calf.

Also, the invention includes a peculiar construction of the elastic sacks and attachment of them to the teat-cups on one side, at or near their bottom, with the necessary valves arranged on the outside of the cups, whereby a closer contraction of the sacks is attainable, thus, in their return action, producing a more perfect suction, and the valves are accessible without removal or disturbance of the sacks.

Likewise, the invention comprises a cheap and advantageous mode of constructing the universal joints by which the teat-cups are made self-adjusting, and further includes a novel arrangement of valves for clearing the apparatus of accumulating air or vapor; also various details or combinations of parts for adding to the efficiency and compactness of the apparatus.

Referring to the accompanying drawing—

A represents a cylindrical vessel or can, which may be open at the top, and is provided with a vertically-reciprocating piston, B.

Said can has arranged round it upwardly-projecting tubular wings or chambers C, in communication at or near their bottoms by openings *a* with the lower end of the can, and through one of which, on removing a screw-cap, *b*, the can may be filled with water or other liquids, for the purpose of producing the necessary suction or action of the teat-sacks by the reciprocating motion of the plunger, as hereinafter described.

Connected and in open communication with the hollow chambers C, at their tops, by ball-and-socket joints, are the teat-cups D, said joints, as in previous cow-milkers invented by me, allowing the teat-cups to adjust themselves to the teats and working of the udder or movements of the animal, but said joints are here constructed in a novel and very simple and efficient manner by forming the lower ends of the cups D with spherical terminations *c*, open at their bottoms, and spinning a strip arranged to surmount each opening *d*, in the tops of the chambers C, around the ball *c* of the joint, to form the socket *e* thereto, and afterward springing or fitting a rubber band, *f*, around the joint, to make tight or close the same, substantially as represented in fig. 4.

The cups D which correspond in number and arrangement to the teats of the cow, are preferably of a variable tapering configuration, increasing in diameter upward to receive, in a free and loose manner within them, the elastic or rubber teat-sacks E, which are of an inverted pyramidal form, closed at their bottoms, and their sides of a convex or fluted configuration, to facilitate their close collapse.

The upper ends *g*, however, of said sacks may be cylindrical, and be turned down over the upper edges of the cups D, as represented in fig. 4. These sacks are of the same thickness, or thereabout, throughout their length, so as to secure uniform play or action, and may be made in pairs by or out of a hollow ball of rubber, having a drop or two of water within it, and expanding the same through heat in a suitable mold, from which, when set and formed by the expansion of the air and steam within the ball, the latter is transformed into a close hollow body that, when divided transversely in the middle, makes two of the elastic sacks E. This is a cheap and very efficient mode of constructing said sacks.

After each sack has been thus made, it has a hole, *h*, punched in its one side near its bottom, to provide for its attachment at one side and one point only, as it were, to its cup D, by a screw-shank, to an outer valve-box, *i*, arranged to project through a perforation in the side of the cup, and through the side hole *h* of the sack into lock or gear with an inside nut, *k*.

This valve-box *i* has a passage, *l*, through it, and is provided, externally, with a flap-valve, *m*, to prevent the ingress of air in the working of the apparatus, from the milk-discharge tube or outlet F, in order that the vacuum within the sack may not be impaired.

By the attachment of the sack at a single point only, as it were, coupled with its specified construction, every provision is afforded for the close collapsing of the sack around and up to the end of the teat, without objectionable pressure on any part of the latter, yet not establishing a vacant air-space at its bottom extremity to vitiate the vacuum within the sack on the expansion of the latter to produce the suction.

By this construction and attachment the teat is always left free and open at the time of "suction," instead of being compressed and closed at that time as it is in most cow-milkers. Also, the arrangement of the valve *m*, on the outside of the cup D, affords every facility, by merely slipping off the milk-tube F from the valve-box, for getting at said valve when repair or clearance is necessary, without taking out or disturbing the sack or its surrounding cup.

Fitted around the upper end of each cup D, and overlapping the bent-over edge *g* of its sack, is an open rubber cap, G, to give a soft bearing against the udder.

The general action is produced by the reciprocating motion of the plunger B causing the water in its cylinder A or chambers C and cups D, communicating therewith, to be worked backward and forward so as to produce an alternate expanding and collapsing action of the sacks E, whereby the milk is drawn from the teats through the valves *m* and elastic discharge-tubes F, which latter may be in pairs or branches arranged to connect adjacent pairs of cups D, and each pair of such branches in communication with a common outlet rubber branch, H, that may be passed through a sleeve in the one chamber C, and made to connect with a general discharge-pipe, I, that empties into any suitable receiving-can or vessel.

Arranged at the top of each cup D, on its outside, is a swell, *n*, open above and below, so as to establish an air-vent down through it from the interior of the cup each time the elastic sack within the cup collapses, to provide for the escape of air accumulating within the water-passages or chambers and cups of the apparatus, and of vapor generated therein, which, in the working of the apparatus, cannot be avoided; and in securing a free and certain escape, therefore, I have heretofore experienced considerable difficulty, but by the arrangement of such vents, as here shown, at the highest points in the apparatus, that is, at the tops of the cups D, all air or vapor, in rising, will necessarily be expelled without discharging the water requisite to produce the proper sucking-action of the teat-sacks, that, in being loosely fitted over the edges of the cups D, also operate as valves to the air-vents, *u*.

The relative capacities of the cylinder A, chambers C and cups D should be such, and the quantity of water or fluid put into them be so regulated as that, in the full down-stroke of the piston B, the chambers C and cups D will be filled with water, or thereabout; but any variable amount of stroke may be given to the piston, according to the force of draught or suction required.

The piston B is operated by means of reversely-cranked handles J J, connected with parallel shafts K K, working through cross-supports L L attached to the cylinder A, said shafts carrying toothed segments M M, which work into a double rack, N, that projects upward from the piston.

By this mode of operating the piston all twist or one-sided swing of the apparatus is avoided, and a steady up-and-down motion of the piston secured; also a straight up-and-down motion, similar to the bunting of a calf, given to the whole apparatus by the working of the handles arranged as described, the piston not only being worked by the handles, but the whole apparatus steadied and carried by them, although it may be allowed to rest on the knees or be otherwise supported, if desired, but in any case should be complete in itself, so that, as a portable device, it may be taken to the cow, whether in her stall or elsewhere, which characteristic broadly distinguishes this invention from other hydraulic cow-milkers.

What is here claimed, and desired to be secured by Letters Patent, is—

1. The arrangement of the handles of a portable hydraulic cow-milking apparatus, substantially as herein shown and described, whereby they are made to serve the two purposes of operating and of carrying and steadying it.

2. The arrangement of the reversely-cranked or cross-handles J J with the shafts K K, toothed segments M M, and operating double rack N to the piston B of the apparatus, essentially as described.

3. The elastic sacks E, constructed substantially as described, and secured, on their one side only, at or through their outlets *h* to the cups D, within which they are arranged for operation, substantially as described.

4. The arrangement, relatively to the elastic sacks and on the outside of the cups D which carry the latter, of the valves *m*, essentially as specified.

5. The construction, substantially as described, of the universal joint by which the teat-cups D are connected with the chamber C, by spinning the sockets *e* around the ball *c* of the joint, and surrounding the whole by an elastic band, *f*.

6. The arrangement of the vent-escapes *n* at or near the tops of the teat-cups D, essentially as specified.

7. The combination of the elastic sacks E with the vent-escapes *n*, arranged substantially as described.

L. O. COLVIN.

Witnesses:
 FRED. HAYNES,
 J. W. COOMBS.